(12) United States Patent
Chung et al.

(10) Patent No.: US 12,268,974 B2
(45) Date of Patent: Apr. 8, 2025

(54) WEARABLE VISUALIZATION DEVICE WITH A RETRACTABLE COVER

(71) Applicant: Universal City Studios LLC, Universal City, CA (US)

(72) Inventors: Christopher Wai Yin Chung, Orlando, FL (US); Douglas Evan Goodner, Orlando, FL (US); Justin Allen Hare, Windermere, FL (US); Andrew Raij, Orlando, FL (US); Jeffrey Scott Boyles, Winter Park, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/500,059

(22) Filed: Nov. 1, 2023

(65) Prior Publication Data

US 2024/0058712 A1 Feb. 22, 2024

Related U.S. Application Data

(63) Continuation of application No. 17/340,279, filed on Jun. 7, 2021, now Pat. No. 11,839,829.

(Continued)

(51) Int. Cl.
*A63G 31/16* (2006.01)
*A63G 31/06* (2006.01)
(Continued)

(52) U.S. Cl.
CPC .............. *A63G 31/16* (2013.01); *A63G 31/06* (2013.01); *G02B 27/0172* (2013.01);
(Continued)

(58) Field of Classification Search
CPC ......... G06F 1/32; G06F 1/3265; G02B 27/01; G02B 27/017; G09G 5/00; A63G 31/16
(Continued)

(56) References Cited

U.S. PATENT DOCUMENTS

| 3,423,150 A | 1/1969 | Freed |
| 5,416,536 A | 5/1995 | Tee, Jr. |

(Continued)

FOREIGN PATENT DOCUMENTS

| CN | 202149984 U | 2/2012 |
| CN | 206339795 U | 7/2017 |

(Continued)

OTHER PUBLICATIONS

PCT/US2021/036465 International Search Report and Written Opinion mailed Sep. 30, 2021.

(Continued)

*Primary Examiner* — Kien T Nguyen
(74) *Attorney, Agent, or Firm* — Fletcher Yoder, P.C.

(57) ABSTRACT

A wearable visualization device includes a housing, one or more lenses coupled to the housing and configured to display virtual features for visualization by a user of the wearable visualization device, and a cover coupled to the housing and configured to adjust between an extended configuration in which the cover extends over at least a portion of the one or more lenses and a retracted configuration in which the cover does not extend over at least the portion of the one or more lenses. The wearable visualization device also includes a controller and one or more sensors. The controller is configured to receive sensor data from the one or more sensors and to provide control signals to an actuator to adjust the cover between the extended configuration and the retracted configuration based on the sensor data.

20 Claims, 12 Drawing Sheets

Related U.S. Application Data

(60) Provisional application No. 63/038,001, filed on Jun. 11, 2020.

(51) Int. Cl.
 *G02B 27/01* (2006.01)
 *G06F 3/01* (2006.01)
 *A63G 7/00* (2006.01)

(52) U.S. Cl.
 CPC ............... *G06F 3/012* (2013.01); *A63G 7/00* (2013.01); *G02B 2027/0141* (2013.01)

(58) Field of Classification Search
 USPC ...................................................... 472/60–61
 See application file for complete search history.

(56) References Cited

U.S. PATENT DOCUMENTS

| | | | |
|---|---|---|---|
| 5,537,160 A | 7/1996 | King | |
| 5,844,530 A | 12/1998 | Tosaki | |
| 9,625,724 B2 | 4/2017 | Mullins et al. | |
| 10,444,800 B2 * | 10/2019 | Sullivan | G06F 1/163 |
| 2004/0104864 A1 | 6/2004 | Nakada | |
| 2005/0001977 A1 | 1/2005 | Zelman | |
| 2012/0056847 A1 | 3/2012 | Milford | |
| 2019/0028697 A1 | 1/2019 | Sullivan et al. | |
| 2019/0094540 A1 | 3/2019 | Greenwood et al. | |
| 2019/0206132 A1 | 7/2019 | Zielkowski | |
| 2020/0241307 A1 | 7/2020 | Schnabel et al. | |

FOREIGN PATENT DOCUMENTS

| | | |
|---|---|---|
| CN | 110727109 A | 1/2020 |
| WO | 2020029180 A1 | 2/2020 |

OTHER PUBLICATIONS

SG Office Action for Singapore Application No. 11202260244Q mailed Oct. 31, 2024.

* cited by examiner

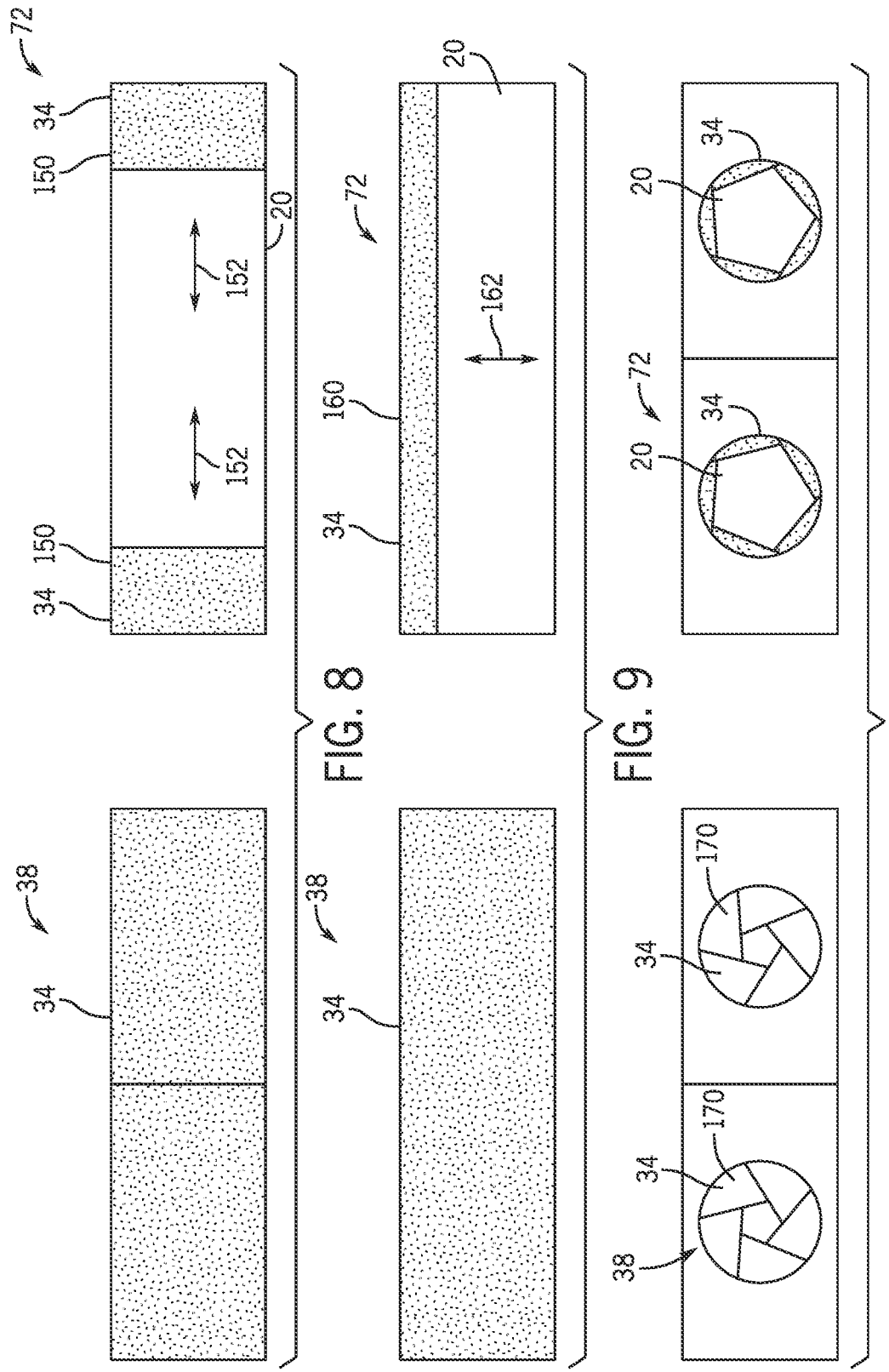

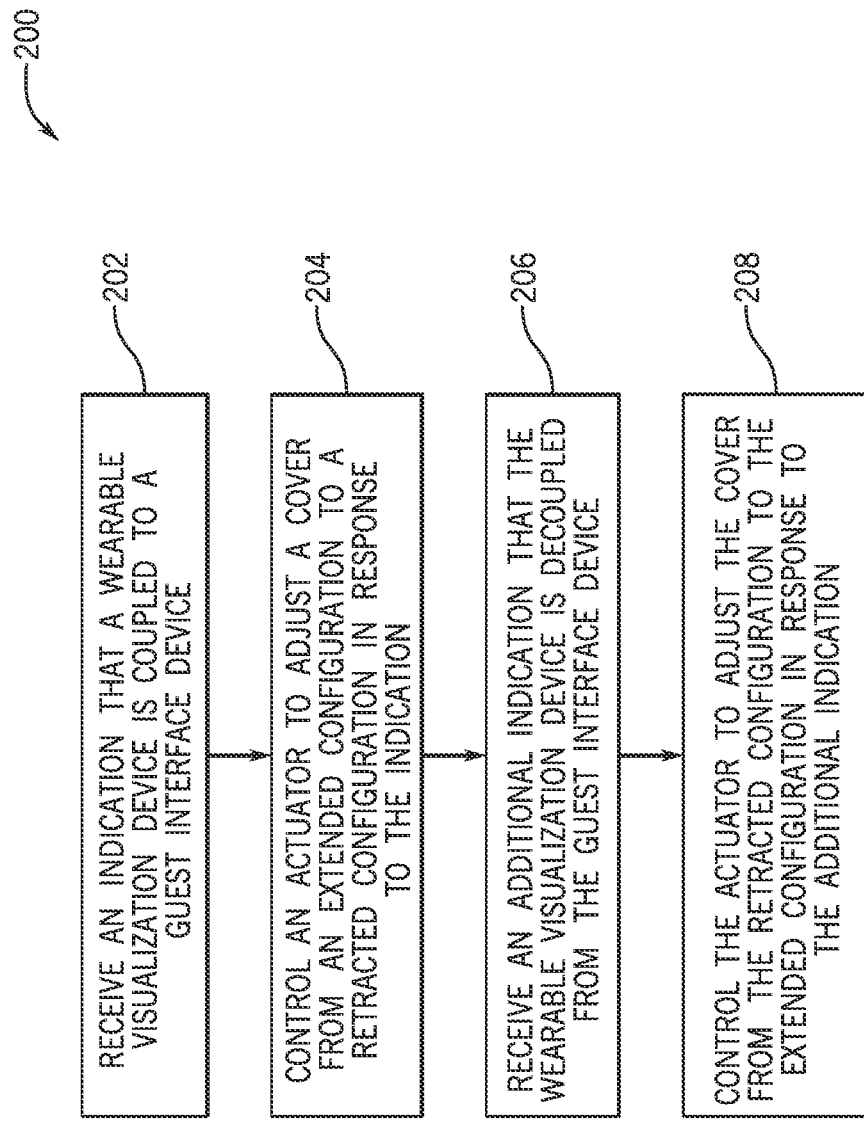

WEARABLE VISUALIZATION DEVICE WITH A RETRACTABLE COVER

CROSS-REFERENCE TO RELATED APPLICATIONS

This application is a continuation of U.S. patent application Ser. No. 17/340,279, entitled "WEARABLE VISUALIZATION DEVICE WITH A RETRACTABLE COVER," filed Jun. 7, 2021, which claims priority from and the benefit of U.S. Provisional Application No. 63/038,001, entitled "WEARABLE VISUALIZATION DEVICE WITH A RETRACTABLE COVER," filed Jun. 11, 2020, both of which are hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various attractions that are useful in providing enjoyment to guests. The attractions of the amusement park may have different themes that are specifically targeted to certain audiences. For example, some attractions may include themes that are traditionally of interest to children, while other attractions may include themes that are traditionally of interest to more mature audiences. It is recognized that it may be desirable to enhance the immersive experience for guests in the attractions, such as by augmenting the themes with virtual features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a wearable visualization device includes a housing, one or more lenses coupled to the housing and configured to display virtual features for visualization by a user of the wearable visualization device, and a cover coupled to the housing and configured to adjust between an extended configuration in which the cover extends over at least a portion of the one or more lenses and a retracted configuration in which the cover does not extend over at least the portion of the one or more lenses. The wearable visualization device also includes a controller and one or more sensors. The controller is configured to receive sensor data from the one or more sensors and to provide control signals to an actuator to adjust the cover between the extended configuration and the retracted configuration based on the sensor data.

In an embodiment, a cover system for a wearable visualization device includes a cover configured to couple to a housing of the wearable visualization device and to adjust between an extended configuration in which the cover extends over at least a portion of one or more lenses of the wearable visualization device and a retracted configuration in which the cover does not extend over at least the portion of the one or more lenses of the wearable visualization device. The cover system also includes an actuator configured to adjust the cover between the extended configuration and the retracted configuration, and a controller configured to provide control signals to the actuator to adjust the cover from the extended configuration to the retracted configuration in response to the wearable visualization device mating with an interface device that is configured to affix to a head of a user.

In an embodiment, a method of operating a cover system for a wearable visualization device includes receiving, at a controller, an indication that the wearable visualization device is coupled to an interface device that is configured to affix to a head of a user. The method also includes controlling, via the controller, an actuator to adjust a cover from an extended configuration in which the cover is positioned over at least a portion of one or more lenses of the wearable visualization device to a retracted configuration in which the cover is not positioned over at least the portion of the one or more lenses of the wearable visualization device in response to receiving the indication that the wearable visualization device is coupled to the interface device.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a schematic view of an embodiment of the cover of FIG. 6, wherein the cover includes laterally-sliding portions that are configured to move in a lateral direction;

FIG. 9 is a schematic view of an embodiment of the cover of FIG. 6, wherein the cover includes a vertically-sliding portion that is configured to move in a vertical direction;

FIG. 10 is a schematic view of an embodiment of the cover of FIG. 6, wherein the cover includes rotating portions that are configured to rotate in a radial direction;

FIG. 14 is a flow diagram of an embodiment of a method of operating a cover of a wearable visualization system, such as the wearable visualization system of FIG. 6.

DETAILED DESCRIPTION

Figure 1:
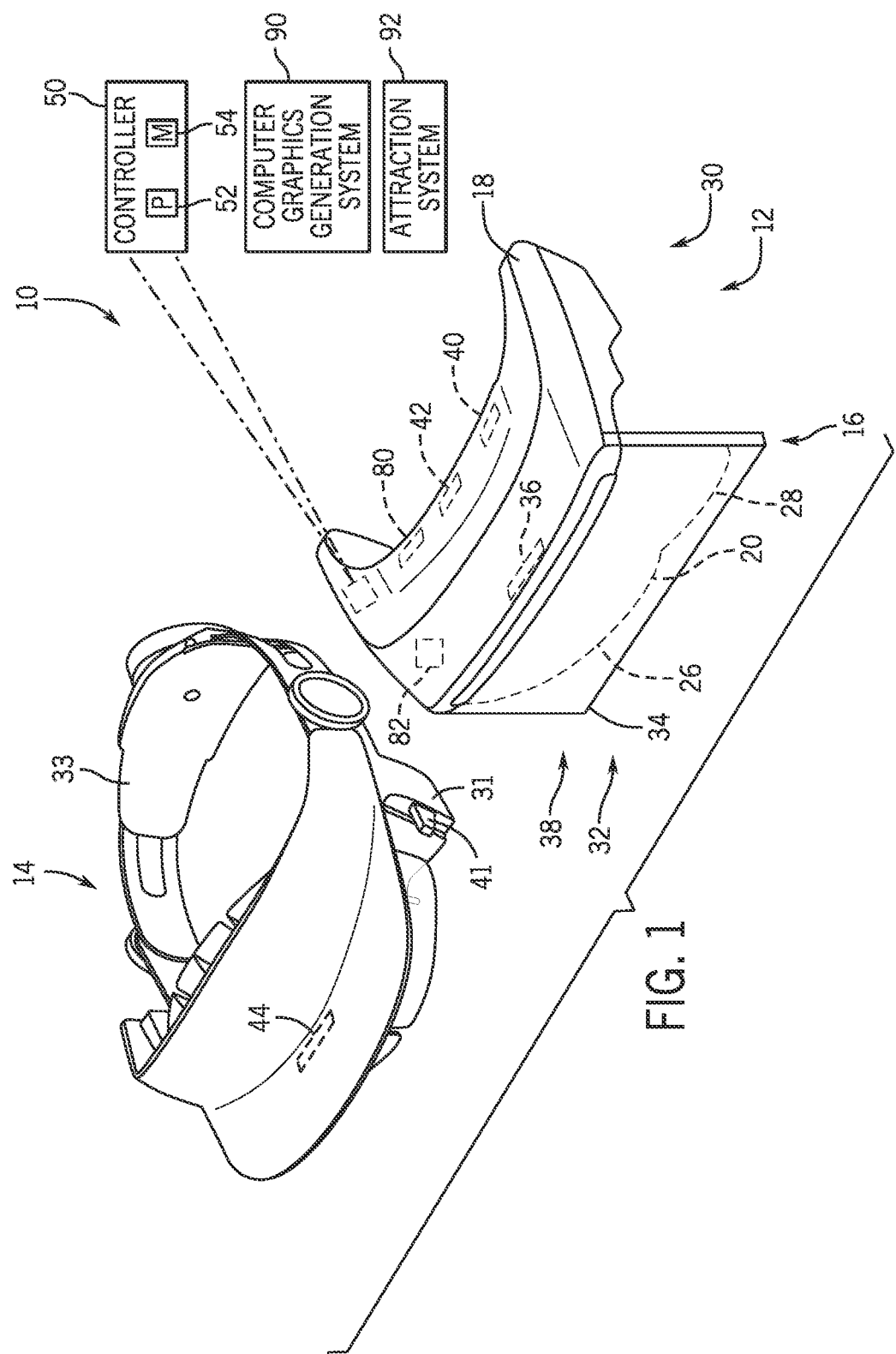
FIG. 1 is a perspective view of an embodiment of a wearable visualization device and a guest interface device in a detached configuration, wherein the wearable visualization device is configured to provide an augmented reality experience.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (combination of AR and VR) system (AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive.

The AR/VR system may include a wearable visualization device, such as a head mounted display (e.g., electronic goggles or displays), which may be worn by a guest and are configured to enable the guest to view virtual features. For example, the wearable visualization device may be utilized to enhance the guest experience by overlaying the virtual features onto a real-world environment of the amusement park attraction, by providing adjustable virtual features to provide different virtual environments while the guest is in the amusement park attraction, and so forth. Advantageously, the wearable visualization device may include a cover (e.g., retractable cover) that is configured to cover at least a portion of the wearable visualization device, such as at least a portion of one or more lenses of the wearable visualization device, at certain times to block damage (e.g., smudges, scratches, particle buildup) to the wearable visualization device. In an embodiment, the wearable visualization device may include a reflective surface, which may be part of the cover, to facilitate placement of the wearable visualization device on the guest by providing a reflection for the guest as visual feedback for guiding engagement. The cover and/or the reflective surface may thereby protect the wearable visualization device, reduce maintenance (e.g., cleaning, replacement), improve viewing quality (e.g., of the virtual features and/or the real-world environment), enhance excitement and enjoyment of the amusement park attraction, improve throughput, and/or reduce costs.

With the foregoing in mind, FIG. 1 is a perspective view of an embodiment of an AR/VR system 10 (e.g., a wearable visualization system) configured to provide a guest (e.g., user) with an AR/VR experience. The AR/VR system 10 includes a wearable visualization device 12 (e.g., a head mounted display) and a guest interface device 14 (e.g., user interface device; interface device), which may be removably coupleable to one another to facilitate usage of the AR/VR system 10.

In FIG. 1, the wearable visualization device 12 may be configured to provide an AR experience in which the guest may view virtual features 2 overlaid onto a real-world environment 4 (e.g., physical structures in an amusement park attraction). As shown, the wearable visualization device 12 may include electronic eyeglasses 16. In an embodiment, the electronic eyeglasses 16 include a housing 18 and one or more lenses 20 (e.g., displays; transparent or semi-transparent) that are coupled to the housing 18. The one or more lenses 20 may enable the guest to simultaneously view the virtual features 2 displayed on the one or more lenses 20 and the real-world environment 4 through the one or more lenses 20. In this way, the guest may perceive the virtual features 2 as being integrated into the real-world environment 4. That is, the one or more lenses 20 may at least partially control a view of the guest by overlaying the virtual features 2 onto a line of sight of the guest. To this end, the wearable visualization device 12 may enable the user to visualize and perceive a surreal environment 6 (e.g., a game environment) having certain virtual features 2 overlaid onto the real-world environment 4 viewable by the guest through the one or more lenses 20. The virtual features 2, the real-world environment 4, and the surreal environment 6 are illustrated schematically in FIG. 1, and these elements may be present in any of the embodiments disclosed herein.

The one or more lenses 20 may include transparent (e.g., see-through) light emitting diode (LED) displays or transparent organic light emitting diode (OLED) displays. The one or more lenses 20 may be a single-piece construction that spans a certain distance so as to display the virtual features 2 to both eyes of the guest. That is, the one or more lenses (e.g., a first lens 26, a second lens 28) may be formed from a single, continuous piece of material, where the first lens 26 is configured to align with a first eye of the guest and the second lens 28 is configured to align with a second eye of the guest. In an embodiment, the first lens 26 and the second lens 28 may be a multi-piece construction that is formed from two or more separate lenses that are coupled to the housing 18. As discussed in more detail below, the wearable visualization device 12 may be configured to provide a VR experience in which the guest may view virtual features 2 as part of a virtual environment (e.g., the wearable visualization device 12 may be a VR headset; without visualization of the real-world environment 4) and/or may be configured to provide a mixed reality experience.

In an embodiment, the wearable visualization device 12 is removably coupleable (e.g., coupled without threaded fasteners, such as bolts; coupleable and separable without tools and without breaking the components of the wearable visualization device 12 or the guest interface device 14) to the guest interface device 14 to enable the wearable visualization device 12 to quickly transition between a detached configuration 30 in which the wearable visualization device 12 is separated (e.g., decoupled) from the guest interface device 14, and an attached configuration in which the wearable visualization device 12 is coupled to the guest interface device 14. The guest interface device 14 is configured to be affixed to a head of the guest to thereby enable the guest to comfortably wear the wearable visualization device 12 through the amusement park attraction, for example. The guest interface device 14 may include an interface frame 31 and an attachment assembly 33 (e.g., head strap) that is configured to span about a circumference of the head of the guest and to be tightened onto the head of the guest. In this manner, the attachment assembly 33 facilitates affixing the guest interface device 14 to the head of the guest, such that the guest interface device 14 may be utilized to retain the wearable visualization device 12 on the guest (e.g., in the attached configuration). Furthermore, the guest interface device 14 enables the guest to efficiently couple and decouple the wearable visualization device 12 from the guest interface device 14 while the guest interface device 14 is on the head of the guest (e.g., without removing the guest interface device 14 from the head of the guest). The guest may wear the guest interface device 14, with or without the wearable visualization device 12 attached, throughout all or part of a duration of a ride of an amusement park ride, during a game, throughout a particular area or amusement park attraction, during a ride to a hotel associated with the amusement park, at the hotel, and so forth.

This two-piece design may enable the guest (or another user, such as an operator of the amusement park attraction) to efficiently couple and decouple the wearable visualization device 12 to the guest interface device 14. For example, the guest may place the guest interface device 14 on their head while the guest waits in a line for the amusement park attraction, and the wearable visualization device 12 may be coupled (e.g., via a wire or tether) to a ride vehicle of the amusement park attraction. Then, the guest may efficiently couple the wearable visualization device 12 to the guest interface device 14 upon boarding the ride vehicle and may efficiently decouple the wearable visualization device 12 from the guest interface device prior to exiting the ride vehicle. However, it should be appreciated that the wearable visualization device 12 and/or the guest interface device 14 may have any of a variety of forms or structures that enable the wearable visualization device 12 to function in the manner described herein. For example, the wearable visualization device 12 and the guest interface device 14 may be integrally formed with one another (e.g., to be applied to and removed from the head of the guest together).

In an embodiment, the wearable visualization device 12 may include a cover system 32 that includes a cover 34 (e.g., retractable cover; one or more retractable cover portions), an actuator 36 (e.g., one or more actuators), and/or one or more control components. For example, the wearable visualization device 12 may include the cover 34 that is configured to adjust between an extended configuration 38 in which the cover 34 is positioned over (e.g., to cover) at least a portion of the one or more lenses 20 (e.g., the portion or an entirety of the one or more lenses 20) and a retracted configuration in which the cover 34 is not positioned over at least the portion of the one or more lenses 20.

The cover 34 may be opaque (e.g., non-transparent; entirely blocks a view of the guest through the cover 34), semi-transparent (e.g., partially blocks a view of the guest through the cover 34), or transparent (e.g., see-through). The cover 34 may be a display surface (e.g., screen or surface) that is configured to display images, such as the virtual features 2, to the guest. In such cases, the cover 34 may not provide the same image quality as the one or more lenses 20, but may provide satisfactory image quality to display certain images (e.g., textual instructions; scenes) to the guest. In an embodiment in which multiple covers 34 are used together (e.g., on an outer surface and on an inner surface), each of the multiple covers 34 may have the same or different characteristics (e.g., opaque, semi-transparent, transparent, and/or display surface). The cover 34 may be formed of any suitable material, such as plastic and/or metal (e.g., metal or metal alloy).

The wearable visualization device 12 may include additional components to facilitate operation and control of the cover 34. For example, the wearable visualization device 12 may include a sensor 40 that is configured to monitor one or more parameters, such as one or more parameters indicative of a position of the wearable visualization device 12 relative to the guest interface device 14. In an embodiment, the sensor 40 may be a proximity sensor or a contact sensor that is configured to detect that the wearable visualization device 12 is coupled to the guest interface device 14.

Furthermore, the sensor 40 and the actuator 36 may be communicatively coupled to a controller 50 (e.g., electronic controller) having a processor 52 and a memory device 54. The controller 50 may be located on the wearable visualization device 12 or separate from the wearable visualization device 12 (e.g., on a ride vehicle; within the amusement park attraction). The controller 50 may be configured to provide control signals to control the actuator 36 based on sensor data received from the sensor 40. For example, the controller 50 may control the actuator 36 to adjust the cover 34 from the extended configuration 38 to the retracted configuration in response to receipt of the sensor data that indicates that the wearable visualization device 12 is properly coupled to the guest interface device 14.

In this way, the cover 34 may be positioned over and protect at least the portion of the one or more lenses 20 while the wearable visualization device 12 is not coupled to the guest interface device 14, and the cover 34 may be retracted from and expose at least the portion of the one or more lenses 20 while the wearable visualization device 12 is coupled to the guest interface device 14. Such features may result in the cover 34 being positioned over at least the portion of the one or more lenses 20 while the wearable visualization device 12 is not in use by the guest, such as while stored on the ride vehicle, while being handled by the guest in order to couple the wearable visualization device 12 to the guest interface device 14, and/or while not being used to display virtual features 2 to the guest. Additionally, such features may result in the cover 34 exposing at least the portion of the one or more lenses 20 while the wearable visualization device is in use by the guest, such as while coupled to the guest interface device 14 while the guest is within the amusement park attraction.

The wearable visualization device 12 and the guest interface device 14 may be coupled to one another via a coupling interface (e.g., key-slot interface, interference fit). In an embodiment, the guest interface device 14 may include a key 41 (e.g., protrusion, prong) that is configured to fit within a slot formed in the housing 18 of the wearable visualization device 12. Additionally or alternatively, the wearable visualization device 12 and the guest interface device 14 may be coupled to one another via a magnetic interface. For example, the wearable visualization device 12 may include one or more magnets 42 and the guest interface device 14 may include one or more magnets 44. When the wearable visualization device 12 is brought in proximity of the guest interface device 14, the magnets 42, 44 may magnetically couple to one another. It should be appreciated that, in an embodiment, the one or more magnets 42 or the one or more magnets 44 may be a suitable reaction material (e.g., metallic plates).

In an embodiment, the one or more magnets 44 of the guest interface device 14 may act as a detectable feature that is detectable by the sensor 40 of the wearable visualization device 12. In operation, when the wearable visualization device 12 and the guest interface device 14 are coupled to one another via the magnets 42, 44, the one or more magnets 44 may be detected by the sensor 40 (e.g., magnetometer, proximity sensor, reed switch, Hall effect sensor). In an embodiment, at least one of the one or more magnets 44 of the guest interface device 14 may not be used for coupling to the one or more magnets 42 of the wearable visualization device 12, but instead may be dedicated for use as the detectable feature that is detectable by the sensor 40. For example, one of the one or more magnets 44 may be positioned to overlay the sensor 40 when the wearable visualization device 12 is coupled with the guest interface device 14. In such cases, the one of the one or more magnets 44 may be any suitable magnetically-responsive material (e.g., piece of iron).

It should be appreciated that the guest interface device 14 may include any suitable detectable feature having any suitable structure, material, and/or placement within the guest interface device 14 to enable detection by the sensor 40 of the wearable visualization device 12. As noted above, the detectable feature may be a magnet, such as one of the one or more magnets 44, and the sensor 40 may be a magnetometer (e.g., proximity sensor, reed switch, or Hall effect sensor) that is configured to detect the magnet. In an embodiment, the sensor 40 may be an optical sensor (e.g., photodetector) that is configured to detect light, and the detectable feature on the guest interface device 14 may include one or more non-transparent or light-reflecting portions configured to block light from reaching the optical sensor when the wearable visualization device 12 is coupled to the guest interface device 14. In an embodiment, the sensor 40 may include a mechanical switch (e.g., physical buttons) positioned on the housing 18 of the wearable visualization device 12, and the detectable feature may include one or more activating features (e.g., protrusions) configured to actuate the mechanical switch when the wearable visualization device 12 is coupled to the guest interface device 14. It should be appreciated that the wearable visualization device 12 may include more than one sensor 40 (e.g., of the same or different type, such as multiple magnetometers and/or one magnetometer and one mechanical switch), and the guest interface device 14 may include corresponding detectable features. In this way, various types of detectable features and sensors 40 may be used separately or in combination to selectively adjust the cover 34.

It should be appreciated that the one or more magnets 42 of the wearable visualization device 12 may be electromagnets that are powered via a wired or wireless power source (e.g., battery). In such cases, the electromagnets may be deactivated to enable separation of the wearable visualization device 12 from the guest interface device 14 at certain times. Similarly, the electromagnets may be activated to facilitate securement of the wearable visualization device 12 to the guest interface device 14 at certain times. The controller 50 may control the electromagnets and the cover 34 in a coordinated manner (e.g., the electromagnets are deactivated and the cover 34 is moved to the extended configuration 38 at substantially the same time).

It should also be appreciated that the actuator 36 may be an electronically-actuated actuator (e.g., controlled via the controller 50) and/or the actuator 36 may be a mechanically-actuated actuator (e.g., controlled via a mechanical linkage; without electronic control via the controller 50). For example, in response to the wearable visualization device 12 being coupled to the guest interface device 14, a mechanical linkage may drive the cover 34 to the retracted configuration. Then, in response to the wearable visualization device 12 being separated from the guest interface device 14, the mechanical linkage may enable the cover 34 to return to the extended configuration 38. In an embodiment, a biasing member may bias the cover 34 toward the extended configuration 38 (or toward the retracted configuration), and a biasing force of the biasing member may be overcome to adjust the cover 34 to the retracted configuration (or toward the extended configuration 38).

Figure 2:
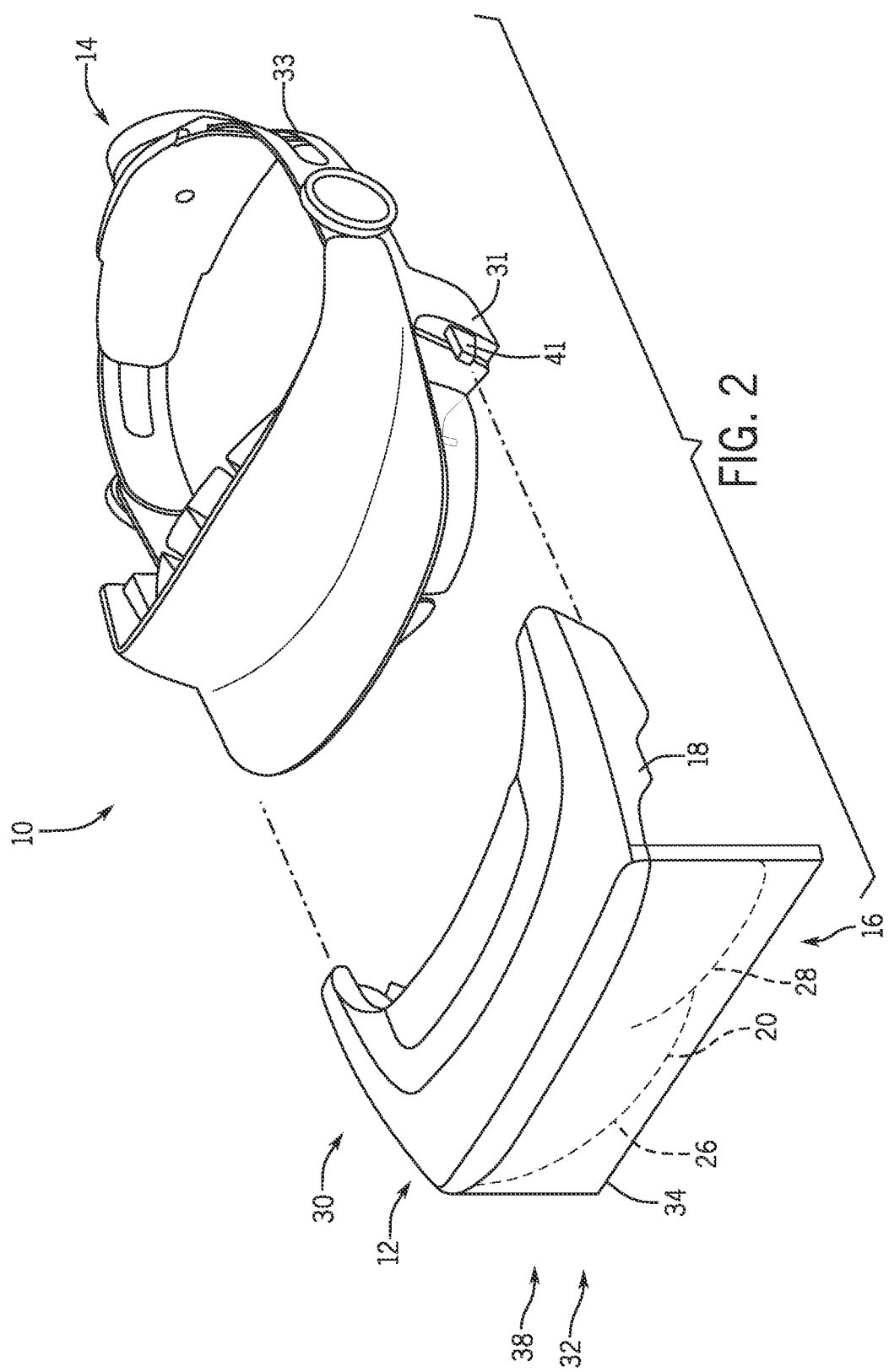
FIG. 2 is a perspective view of the wearable visualization device and the guest interface device of FIG. 1 during a coupling process.
Figure 3:
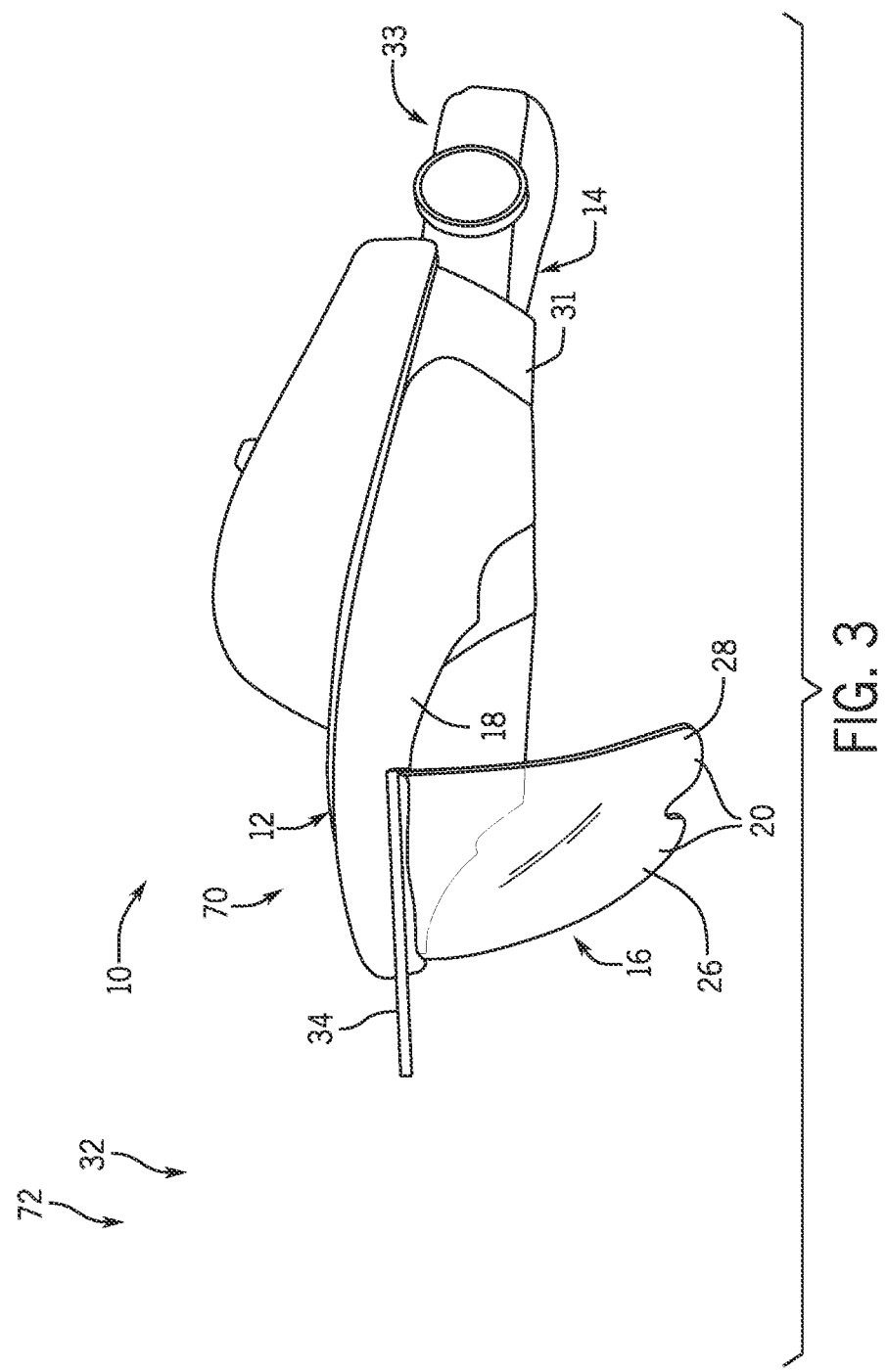
FIG. 3 is a perspective view of the wearable visualization device and the guest interface device of FIG. 1 in an attached configuration.

FIGS. 2 and 3 illustrate the transition between the detached configuration 30 and an attached configuration 70. In particular, FIG. 2 is a perspective view of the wearable visualization device 12 and the guest interface device 14 during a coupling process, and FIG. 3 is a perspective view of the wearable visualization device 12 and the guest interface device 14 in the attached configuration 70. In FIG. 3, the cover 34 is in a retracted configuration 72 in which the cover 34 does not cover the one or more lenses 20 and/or enables the guest to view the real-world environment through the one or more lenses 20. As noted above, the controller 50 may provide control signals to the actuator 36 to adjust the cover 34 between the extended configuration 38 and the retracted configuration 72 in response to detection of the wearable visualization device 12 being coupled to the guest interface device 14 to thereby protect the one or more lenses 20.

With reference to FIG. 2, to couple the wearable visualization device 12 to the guest interface device 14, the guest may translate the wearable visualization device 12 toward the guest interface device 14. The guest may translate the wearable visualization device 12 toward the guest interface device 14 until the coupling interface and/or the magnetic interface couple the wearable visualization device 12 to the guest interface device 14 to thereby place the wearable visualization device 12 in the attached configuration 70. The guest may translate the wearable visualization device 12 toward the guest interface device 14 while the guest interface device 14 is affixed to the head of the guest. The cover 34 may be positioned in the extended configuration 38 during the coupling process to thereby protect the one or more lenses 20 from smudges, scratching, and/or particle buildup due to handling by the guest. Additionally, the wearable visualization device 12 may remain in the attached configuration 70 with respect to the guest interface device 14 until the guest manually removes the wearable visualization device 12 from the guest interface device 14 (e.g., by pulling the wearable visualization device 12 away from the guest interface device 14, which may be done while the guest interface device 14 remains on the head of the guest).

In an embodiment, the wearable visualization device 12 may be physically coupled (e.g., tethered via a cable) to a structure (e.g., a ride vehicle) to block separation of the wearable visualization device 12 from the structure. Thus, once the guest adjusts the wearable visualization device 12 to the detached configuration 30, the wearable visualization device 12 may remain attached to the structure and the guest may carry the guest interface device 14 away from the structure (e.g., to use in another amusement park attraction; to place in a discard bin for washing). It should be appreciated that the wearable visualization device 12 may be electronically coupled (e.g., via the cable) to the controller 50 and/or another computing system to facilitate operation of the wearable visualization device 12 (e.g., display of the virtual features 2; adjustment of the cover 34), as discussed in more detail below.

As shown in FIGS. 1-3, the cover 34 is positioned on an outer surface (e.g., facing away from the guest; the one or more lenses 20 is between the cover 34 and the guest while the wearable visualization device 12 is worn by the guest) of the one or more lenses 20. It should be appreciated that the cover 34 may instead be positioned on an inner surface (e.g., facing toward the guest, the cover 34 is between the one or more lenses 20 and the guest while the wearable visualization device 12 is worn by the guest) of the one or more lenses 20. Furthermore, the cover 34 may be positioned on the outer surface, and an additional cover (e.g., having any of the features as the cover 34 disclosed herein) may be positioned on the inner surface to thereby provide protection on both sides of the one or more lenses 20.

The AR/VR system 10 may be configured to use other types of data, in addition or as an alternative to the sensor data from the sensor 40 (e.g., sensor data that indicates the position of the wearable visualization device 12 relative to the guest interface device 14), to adjust the cover 34 between the extended configuration 38 and the retracted configuration 72. For example, with reference to FIG. 1, the wearable visualization device 12 may include a sensor 80 that is configured to monitor one or more parameters indicative of a position of the wearable visualization device 12 relative to the head of the guest. In an embodiment, the sensor 80 may be an optical sensor (e.g., photodetector) that is configured to detect light and that is configured to align with an opening (e.g., through hole) in the guest interface device 14. Specifically, in such an embodiment, the sensor 80 and the opening in the guest interface device 14 may be arranged such that, when the wearable visualization device 12 and the guest interface device 14 are in the attached configuration 70, they enable light to reach the sensor 80 while not positioned on the head of the guest. However, while positioned on the head of the guest with the wearable visualization device 12 and the guest interface device 14 in this same attached configuration 70, the head of the guest will block the light from reaching the sensor. In another embodiment, the sensor 80 may include a mechanical switch (e.g., physical buttons) positioned on the housing 18 of the wearable visualization device 12 and positioned so that the head of the guest actuates the mechanical switch when the wearable visualization device 12 and the guest interface device 14 in the attached configuration 70 are positioned on the head of the guest.

The controller 50 may provide control signals to the actuator 36 based on the sensor data from the sensor 80. For example, the controller 50 may provide control signals to the actuator 36 to adjust the cover 34 to the extended configuration 38 to be positioned over and protect at least the portion of the one or more lenses 20 while the wearable visualization device 12 is positioned on the head of the guest, and the controller 50 may provide control signals to the actuator 36 to adjust the cover 34 to the retracted configuration 72 to expose at least the portion of the one or more lenses 20 while the wearable visualization device 12 is positioned on the head of the guest.

In an embodiment, the wearable visualization device 12 may include a sensor 82 that is configured to monitor one or more parameters indicative of movement of the wearable visualization device 12 (e.g., relative to the ride vehicle, relative to an expected movement). The sensor 82 may be a position or motion-tracking sensor, such as an accelerometer, a gyroscope, or an inertial measurement unit (IMU), that is configured to monitor one or more parameters (e.g., accelerations and/or decelerations) indicative of the wearable visualization device 12 being improperly handled. For example, the sensor data from the sensor 82 may indicate whether the wearable visualization device 12 is experiencing any unexpected movement (e.g., drops, throws, lifted or removed from the head of the guest during a ride cycle). The controller 50 may process the sensor data from the sensor 82, such as by comparing the sensor data to stored data sets (e.g., template matching) that correspond to certain improper movement and/or expected movements of the wearable visualization device 12 during enjoyment of the amusement park attraction.

The controller 50 may provide control signals to the actuator 36 based on the sensor data from the sensor 82. For example, the controller 50 may provide control signals to the actuator 36 to adjust the cover 34 to the extended configuration 38 to be positioned over and protect at least the portion of the one or more lenses 20 while the wearable visualization device 12 is experiencing unexpected movement (e.g., for more than a threshold period of time), and the controller 50 may provide control signals to the actuator 36 to adjust the cover 34 to the retracted configuration 72 to expose at least the portion of the one or more lenses 20 as long as the wearable visualization device 12 is experiencing expected movement. It should be appreciated that other types of sensors may be utilized, such as sensors (e.g., image sensors) that detect hands or another object approaching the wearable visualization device. In such cases, detection of the hands or the object approaching the wearable visualization device may cause the controller 50 to provide the control signals to the one or more actuators 36 to adjust the cover 34 to the extended configuration 38 at least until the hands or the other object are no longer detected and/or for some period of time. It should also be appreciated that the wearable visualization device 12 may include more than one sensor 40, 80, 82 (e.g., of the same or different type). In this way, various types sensor data and sensors 40, 80, 82 may be used separately or in combination to selectively adjust the cover 34.

In an embodiment, the AR/VR system 10 may be configured to additionally or alternatively utilize show data that is related to the AR/VR experience to adjust the cover 34 between the extended configuration 38 and the retracted configuration 72. The show data may be indicative of a timing of virtual features 2 that will be presented on the one or more lenses 20 and/or instructions for the cover 34 to assume either the extended configuration 38 or the retracted configuration 72 in coordination with the show data. In an embodiment, a computer graphics generation system 90 may be a server or game controller (e.g., positioned on the ride vehicle or within the amusement park attraction) that is configured to generate the virtual features 2 to be presented via the wearable visualization device 12, and the computer graphics generation system 90 may provide the show data to the controller 50. For example, the controller 50 may maintain the cover 34 in the extended configuration 38 while no virtual features 2 and/or while certain virtual features 2 (e.g., text, menus, score achieved by the guest during a game played in the amusement park attraction, or other virtual features to provide a VR experience to the guest) are displayed on the one or more lenses 20, such as to enable the guest to view these virtual features 2 more clearly and without the real-world environment 4 in the background (e.g., with the cover 34 being opaque). Then, the controller 50 may adjust the cover 34 to the retracted configuration 72 after display of these virtual features 2 and/or to correspond to the display of other virtual features 2 that should be viewed simultaneously with the real-world environment 4.

It should be appreciated that these operations may be carried out with the cover 34 on the outer surface of the one or more lenses 20, as shown. However, these operations may be carried out with the cover 34 on the outer surface of the one or more lenses 20, and the additional cover on an inner surface of the one or more lenses 20. In such cases, both the cover 34 on the outer surface and the additional cover on the inner surface may be in the extended configuration 38 until the wearable visualization device 12 is coupled to the guest interface device 14. Then, the cover 34 on the outer surface may remain in the extended configuration 38 while the additional cover on the inner surface is in the retracted configuration 72 to enable display of certain virtual features 2 without the real-world environment 4 in the background. Then, the cover 34 on the outer surface may be adjusted to the retracted configuration 72 so that other virtual features 2 can be displayed over the real-world environment 4. Thus, the cover 34 and the additional cover may be controlled independently of one another to provide various effects. In some such cases, both the cover 34 on the outer surface and the additional cover on the inner surface may be opaque. However, it should be appreciated that the cover 34 on the outer surface may be transparent or opaque, and the additional cover on the inner surface may be transparent, opaque, or operate as a display screen or surface to display virtual images 2 to the guest to thereby provide different effects and features.

In an embodiment, the AR/VR system 10 may be configured to additionally or alternatively utilize attraction data (e.g., ride data) that is related to the amusement park attraction to adjust the cover 34 between the extended configuration 38 and the retracted configuration 72. The ride data may be indicative of a timing of ride features (e.g., uphill and downhill portions of a ride path, a beginning and end of a ride cycle, movement of the ride vehicle) and/or instructions for the cover 34 to assume either the extended configuration 38 or the retracted configuration 72 in coordination with the ride data. In an embodiment, an attraction system 92 may be a server or attraction controller (e.g., positioned within the amusement park attraction) that is configured to control the amusement park attraction, such as to control the ride vehicle along a ride path, and the attraction system 92 may provide the ride data to the controller 50. For example, the controller 50 may maintain the cover 34 in the extended configuration 38 while the ride vehicle is within a loading/unloading zone of the amusement park attraction and/or may adjust the cover 34 to the retracted configuration 72 as the ride vehicle begins moving to depart the loading zone. The attraction system 92 may operate as a master controller that is configured to provide control signals to the computer graphics generation system 90 and to the controller 50 to coordinate the presentation of the virtual features 2 and the operation of the cover 34 with aspects of the amusement park attraction.

More particularly, the controller 50 may receive the ride data that indicates that the ride vehicle is has been cleared to depart or will soon depart, has departed, and/or is moving within the loading/unloading zone at a beginning of the ride cycle, and in response, the controller 50 may provide control signals to the actuator 36 to adjust the cover 34 from the extended configuration 38 to the retracted configuration 72. Similarly, the controller 50 may receive the ride data that indicates that the ride vehicle is approaching, has entered, and/or is stopped within the loading/unloading zone at an end of the ride cycle, and in response, the controller 50 may provide control signals to the actuator 36 to adjust the cover 34 from the retracted configuration 72 to the extended configuration 38. In an embodiment, the ride data may be used to adjust the cover 34 during the ride cycle and/or in coordination with features of the amusement park attraction to provide a more thrilling experience. For example, the cover 34 may be positioned in the extended configuration 38 to block the view of the real-world environment 4 during an uphill portion of a rollercoaster (e.g., with the cover 34 being opaque) and then suddenly adjusted to the retracted configuration 72 to enable the view of the real-world environment 4 during the downhill portion of the rollercoaster, or other similar effects. In an embodiment, the controller 50 may receive the ride data that indicates that the guest is properly restrained within the ride vehicle (e.g., a restraint, such as a lap bar or a belt is in a locked position; via a sensor in the restraint), and in response, the controller 50 may provide control signals to the actuator 36 to adjust the cover 34 from the extended configuration 38 to the retracted configuration 72.

In an embodiment, the AR/VR system 10 may be configured to additionally or alternatively utilize a user input (e.g., input data, input by an operator of the amusement park attraction and/or the guest) to adjust the cover 34 between the extended configuration 38 and the retracted configuration 72. The user inputs may be indicative of a request or instruction to adjust the cover 34 to either the extended configuration 38 or the retracted configuration 72. For example, the operator may observe that a guest has removed the wearable visualization device 12 from the head of the guest, but that the cover 34 is in the retracted configuration 72. The operator may then provide the user input (e.g., via an operator station that is communicatively coupled to the controller 50) to instruct the controller 50 to provide the control signals to the actuator 36 to adjust the cover 34 to the extended configuration 38. In an embodiment, the guest may wish adjust the cover 34 to the extended configuration 38, such as to block their view of the real-world environment 4 through the one or more lenses 20. The guest may then provide the user input (e.g., via an input device on the wearable visualization device 12, or the ride vehicle, or within the amusement park attraction to instruct the controller 50 to provide the control signals to the actuator 36 to adjust the cover 34 to the extended configuration 38.

It should be appreciated that the sensor data from one or more of the sensors 40, 80, 82, show data, ride data, and/or user inputs may be utilized to adjust the cover 34. In this way, various types of data may be used separately or in combination to selectively adjust the cover 34. For example, the cover 34 may be adjusted to the retracted configuration 72 in response to multiple types of data indicating that the retracted configuration 72 is appropriate, such as both the sensor data from the sensor 40 and the ride data and/or the show data indicating that the retracted configuration 72 is appropriate (e.g., the wearable visualization device 12 is coupled to the guest interface device 14 and the virtual features 2 to be viewed over the real-world environment 4 will be shown; the wearable visualization device 12 is coupled to the guest interface device 14 and a ride vehicle is in a particular part of a ride path or ride cycle). The examples of types of data that may be utilized to adjust the cover 34 is not exhaustive, and it should be appreciated that other types of data may be considered. For example, additionally or alternatively, a maintenance system (which may be part of the attraction system 92) may detect that the wearable visualization device 12 is due for a maintenance procedure (e.g., is not working properly; routine maintenance), and the maintenance system may provide maintenance data to the controller 50 that indicate that the cover 34 should remain in the extended configuration 38 until the maintenance procedure is completed.

While FIGS. 1-3 and the related discussion relate primarily to AR implementations, the wearable visualization device 12 may instead be used for viewing VR content. For example, the wearable visualization device 12 may be a VR headset that control or limits the view of the guest (e.g., using opaque viewing surfaces), such as opaque or non-transparent displays configured to display virtual features 2 (e.g., VR features) to the guest. As such, the wearable visualization device 12 in VR implementations may enable the guest to feel completely encompassed by the surreal environment 6 such that the guest perceives the surreal environment 6 to be the real-world environment 4 that includes certain virtual features 2. In an embodiment, the surreal environment 6 viewable by the guest may be a real-time video that includes real-world images of the physical, real-world environment 4 electronically merged with one or more virtual features 2. With the preceding in mind, it should be appreciated that the surreal environment 6 may include an AR experience, a VR experience, a mixed reality experience, a computer-mediated reality experience, a combination thereof, or another suitable surreal environment 4.

Figure 4:
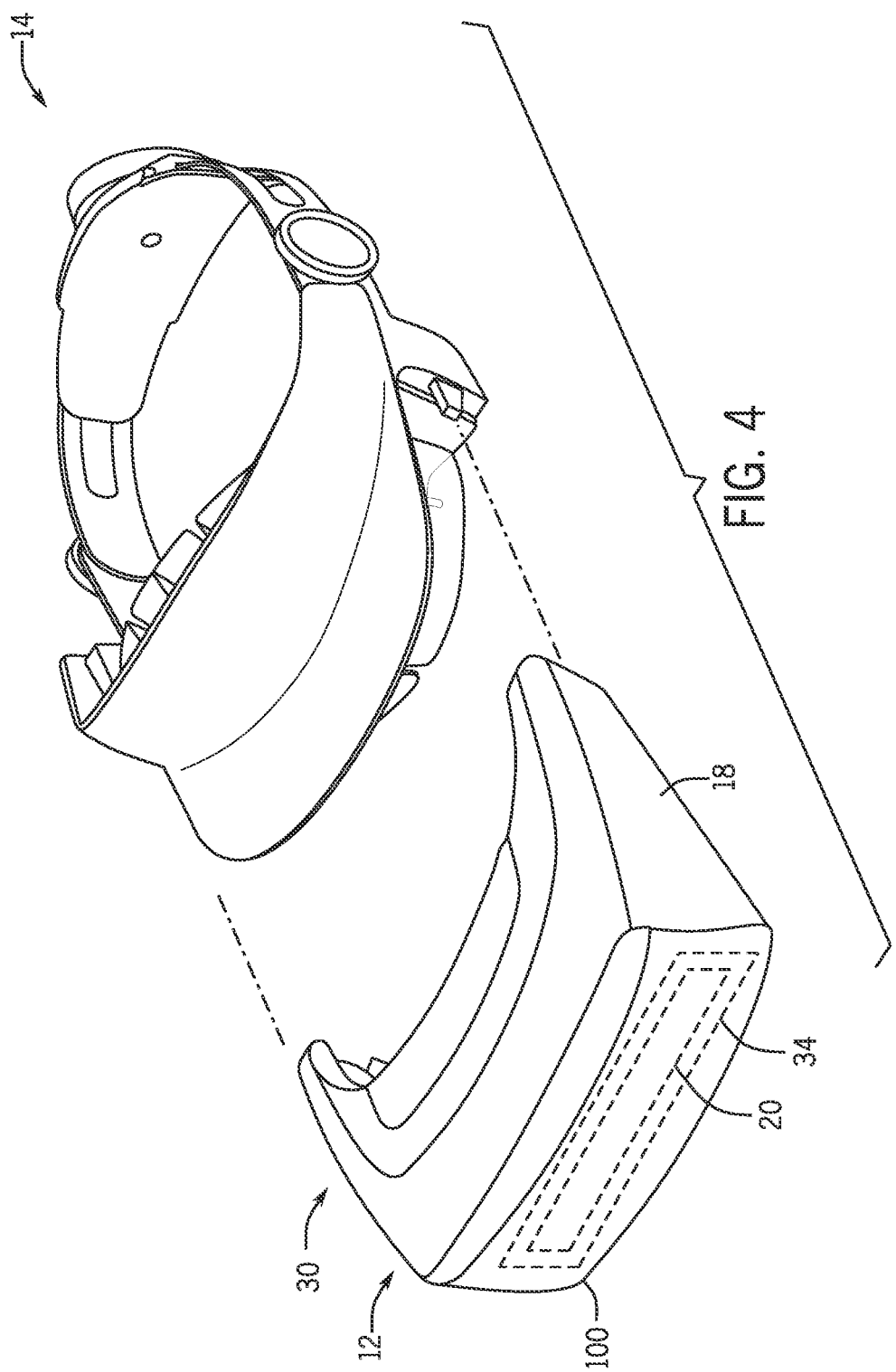
FIG. 4 is a perspective view of an embodiment of a wearable visualization device and a guest interface device during a coupling process, wherein the wearable visualization device is configured to provide a virtual reality experience.
Figure 5:
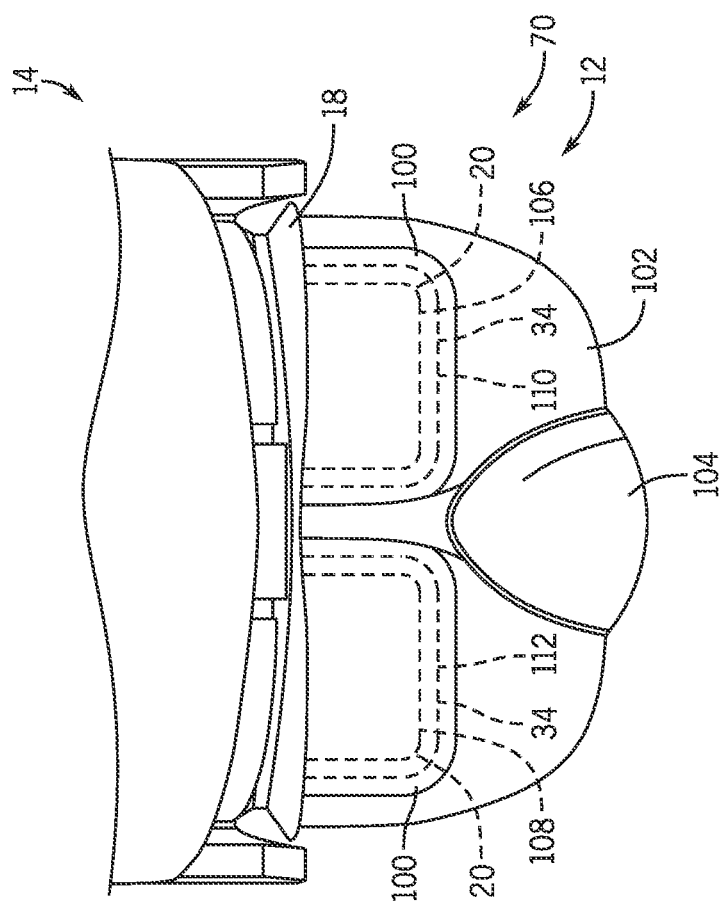
FIG. 5 is a front view of an embodiment of a wearable visualization device and a guest interface device in an attached configuration, wherein the wearable visualization device is configured to provide a virtual reality experience.

With the foregoing in mind, FIGS. 4 and 5 illustrate different configurations for the wearable visualization device 12. In particular, FIG. 4 is a perspective view of an embodiment of the wearable visualization device 12 and the guest interface device 14 during a coupling process, wherein the wearable visualization device 12 is configured to provide a VR experience. FIG. 5 is a front view of an embodiment of the wearable visualization device 12 and the guest interface device 14 in the attached configuration 70, wherein the wearable visualization device 12 is configured to provide a VR experience.

In FIG. 4, the one or more lenses 20 are displays that face toward the guest and that display the virtual features to the guest. The one or more lenses 20 may include an opaque or semi-transparent (e.g., light filtering) backing 100 that that is part or is coupled to housing 18 of the wearable visualization device 12. The cover 34 may be positioned over at least a portion of an inner surface (e.g., facing toward the guest, the cover 34 is between the one or more lenses 20 and the guest while the wearable visualization device 12 is worn by the guest) of the one or more lenses 20. In this way, the cover 34 may cover and protect the one or more lenses 20 that are utilized to display the virtual features to the guest. In an embodiment, the cover 34 may instead be positioned on an outer surface (e.g., facing away from the guest; the one or more lenses 20 is between the cover 34 and the guest while the wearable visualization device 12 is worn by the guest) of the one or more lenses 20 and/or the backing 100. Furthermore, the cover 34 may be positioned on the inner surface, and an additional cover may be positioned on the outer surface to thereby provide protection on both sides of the one or more lenses 20. The wearable visualization device 12 is shown in the detached configuration 30 and may include any of the features (e.g., the sensors, the magnets, the controller) disclosed above with respect to FIGS. 1-3.

In FIG. 5, the wearable visualization device 12 includes a facemask portion 102, with a nose guard 104, that is configured to fit over a face of the guest. The facemask portion 102 may help position and/or align the wearable visualization device 12 to the face of the guest, as well as block light to enhance visualization of the virtual features provided via the one or more lenses 20. In FIG. 5, the one or more lenses 20 includes two separate lenses, such as a first lens 106 and a second lens 108. In such cases, the cover 34 may be configured to cover both the first lens 106 and the second lens 108, or the cover 34 may include two cover portions, such as a first cover portion 110 and a second cover portion 112 (e.g., one for each of the first lens 106 and the second lens 108). As noted above, the first lens 106 and the second lens 108 may include the backing 100 that that is part of or is coupled to the housing 18 and/or the facemask portion 102.

The cover 34 may be positioned over at least a portion of an inner surface (e.g., facing toward the guest, the cover 34 is between the first lens 106 and the second lens 108 and the guest while the wearable visualization device 12 is worn by the guest) of the first lens 106 and the second lens 108. In this way, the cover 34 may cover and protect the first lens 106 and the second lens 108 that are utilized to display the virtual features to the guest. In an embodiment, the cover 34 may instead by positioned on an outer surface (e.g., facing away from the guest; the first lens 106 and the second lens 108 are between the cover 34 and the guest while the wearable visualization device 12 is worn by the guest) of the first lens 106 and the second lens 108 and/or of the backing 100. Furthermore, the cover 34 may be positioned on the inner surface, and an additional cover may be positioned on the outer surface to thereby provide protection on both sides of the first lens 106 and the second lens 108. The wearable visualization device 12 is shown in the attached configuration 70 and may include any of the features (e.g., the sensors, the magnets, the controller) disclosed above with respect to FIGS. 1-3.

It should be appreciated that the wearable visualization device 12 and the guest interface device 14 may have any of a variety of forms. For example, the wearable visualization device 12 may be the electronic eyeglasses 16, as shown in FIGS. 1-3, or a VR headset, as shown in FIGS. 4 and 5. Furthermore, the guest interface device 14 may be a visor, as shown in FIGS. 1-3, a helmet, as shown in FIG. 4, or any other suitable structure to couple the wearable visualization device 12 to the head of the guest. In practice, it should be appreciated that any combination of these embodiments (e.g., visor and electronic eyeglasses, helmet and electronic eyeglasses, visor and VR headset, helmet and VR headset) may be practiced, and the present examples are not intended to be limiting, but are instead intended to provide select, meaningful, and illustrative real-world examples for the purpose of explanation.

Figure 6:
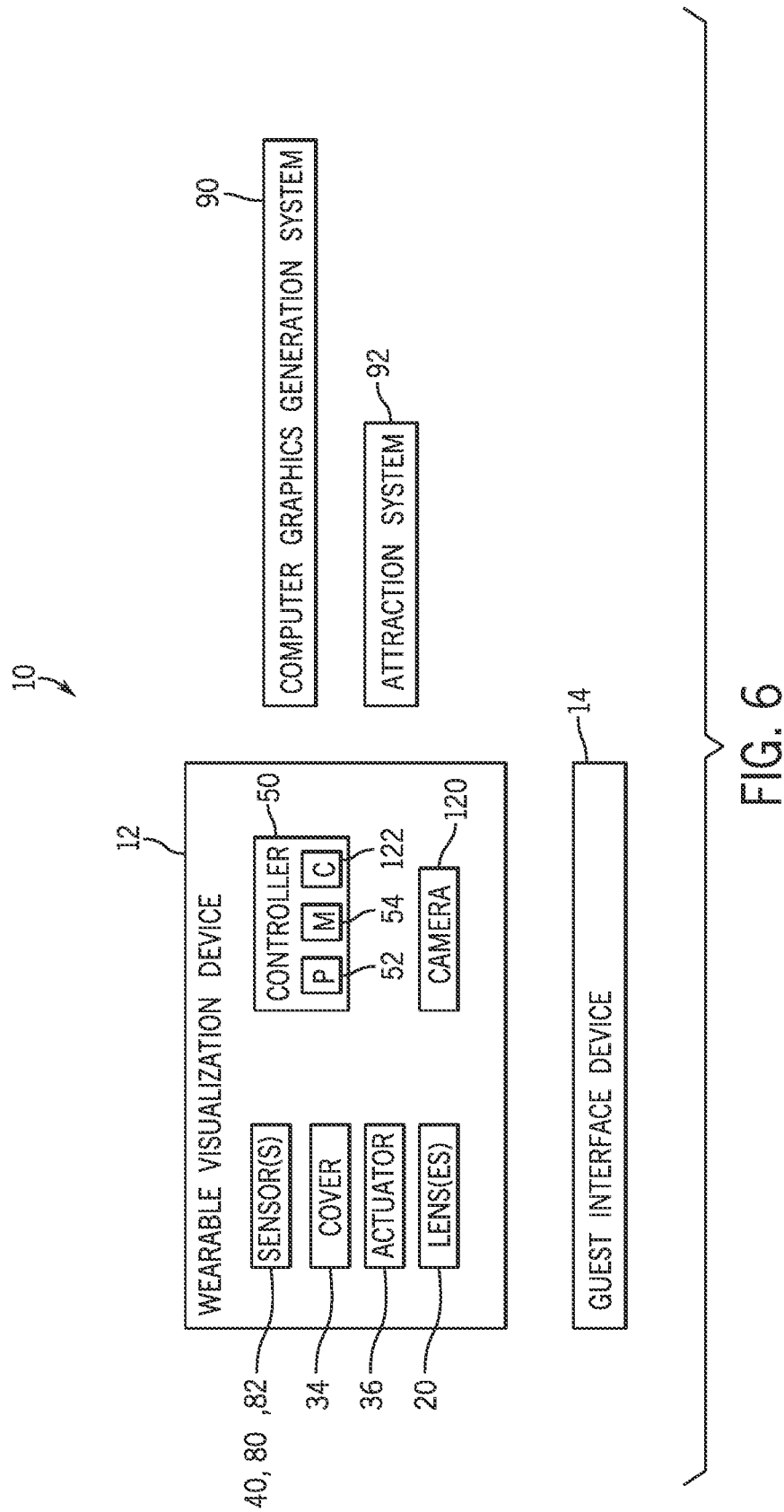
FIG. 6 is a schematic diagram of an embodiment of a wearable visualization system that may be utilized to adjust a cover of a wearable visualization device, such as any of the wearable visualization devices of FIGS. 1-5.

Regardless of the form of the wearable visualization device 12 and the guest interface device 14, the AR/VR system 10 may include the components disclosed herein that operate to adjust the cover 34 between the extended configuration and the retracted configuration. FIG. 6 is a schematic diagram of the components that may be included in the AR/VR system 10. As shown, the wearable visualization device 12 may include the sensor 40, the sensor 80, the sensor 82, the one or more lenses 20, the cover 34, and/or the actuator 36. The wearable visualization device 12 may also include other components, such as a camera 120 that is configured to obtain images of the real-world environment (e.g., for use in creating the surreal environment in during VR implementations). The camera 120 may be configured to operate (e.g., powered on) in response to the wearable visualization device 12 being coupled to the guest interface device 14, or in response to any other data disclosed herein. Thus, the camera 120 may be configured to operate in coordination with the cover 34 (e.g., the camera 120 is powered on at the same time or subsequent to the cover 34 moving to the retracted configuration).

The wearable visualization device 12 may include or be communicatively coupled to the controller 50, which may have the processor 52 and the memory device 54. As discussed above, the controller 50 may be configured to provide control signals to the actuator 36 to adjust the cover 34 relative to the one or more lenses 20. The controller 50 may be configured to provide the control signals based on sensor data received from the sensor 40, the sensor 80, and/or the sensor 82. Additionally or alternatively, the controller 50 may be configured to provide the control signals based on other types of data, such as show data received from the computer graphics generation system 90, ride data received from the attraction system 92, and/or user inputs received from a user (e.g., an operator, the guest). In particular, the controller 50 may process the sensor data and/or the other types of data and may determine an appropriate position for the cover 34 (e.g., the extended configuration or the retracted configuration), and the controller 50 may then provide the control signals to the actuator 36 to adjust the cover 34 to the appropriate position.

The controller 50 may include the processor 52 and the memory device 54. The processor 52 may include one or more general purpose microprocessors, one or more application specific processors (ASICs), one or more field programmable gate arrays (FPGAs), or any combination thereof. The memory device 54 may include one or more tangible, non-transitory, computer-readable media that store instructions executable by the processor 52 and/or data (e.g., parameters; a number of events) to be processed by the processor 52. For example, the memory device 54 may include random access memory (RAM), read only memory (ROM), rewritable non-volatile memory such as flash memory, hard drives, optical discs, and/or the like. Further, the memory device 54 may store instructions executable by the processor 52 to perform the methods and control actions described herein. As shown, the controller 50 also includes a communication device 122, which is configured to facilitate communication (e.g., wired or wireless communication via a communication network) between the controller 50, the computer graphics generation system 90, the attraction system 92, and/or any other system. It should be appreciated that the computer graphics generation system 90, the attraction system 92, and any other system that is in communication with the controller 50 may also include a respective processor, a respective memory, and a respective communication device to enable the AR/VR system 10 to carry out the disclosed techniques. Additionally, it should be appreciated that the functions and processing steps described herein may be distributed in any suitable manner between the controller 50, the computer graphics generation system 90, the attraction system 92, and/or any other suitable system. Indeed, any computing system having one or more processors or any combination of computing systems (e.g., distributed computing system having multiple processors) may be utilized to carry out the disclosed techniques. In an embodiment, the components (e.g., sensors, processor) that operate to control the cover 34 may be entirely contained within the wearable visualization device 12 (e.g., within the housing of the wearable visualization device 12). In some such cases, the wearable visualization device 12 may not communicate (wirelessly or via a wired connection) to an off-board computing system, and instead may include components to perform some or all of the functions disclosed herein.

Figure 7:
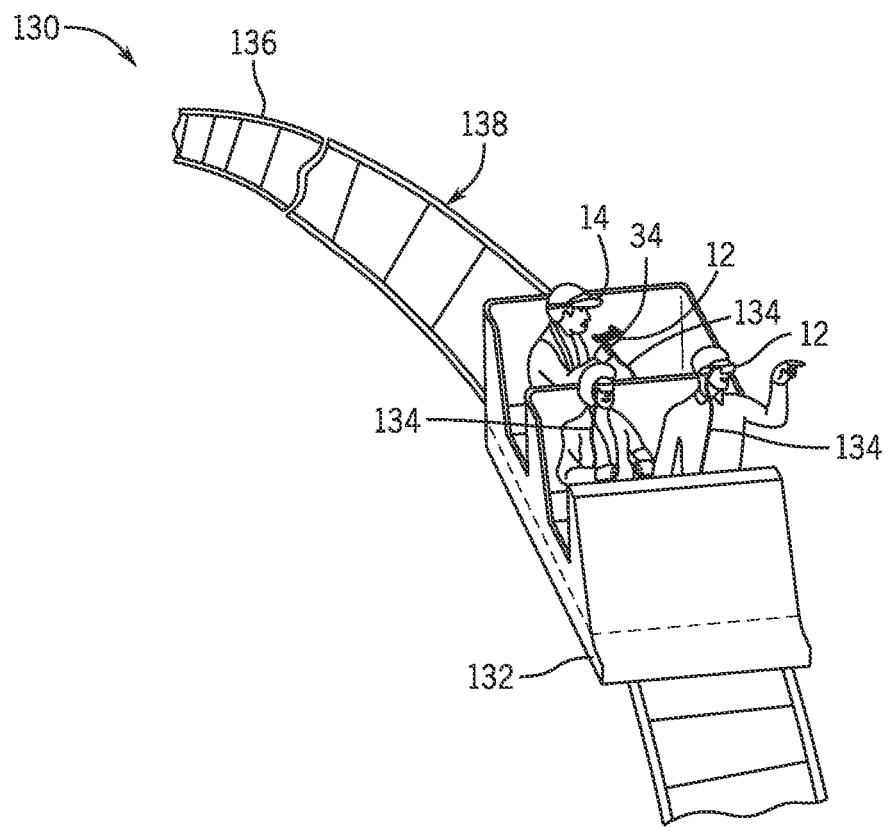
FIG. 7 is a perspective view of an embodiment of a portion of a ride attraction in which the wearable visualization system of FIG. 6 may be utilized to provide an augmented reality experience, a virtual reality experience, or both.

FIG. 7 is a perspective view of an amusement park attraction 130 (e.g., ride attraction) in which the AR/VR system 10 may be employed to provide an AR/VR experience to the guest. In operation, each guest may be provided with a respective guest interface device 14 (e.g., upon entry into the amusement park and/or while waiting in line for the amusement park attraction) that may be worn by the guest for a period of time, such as throughout the amusement park (e.g., in multiple different amusement park attractions) or throughout the duration of the amusement park attraction (e.g., on a single ride). For example, prior to boarding a ride vehicle 132 of the amusement park attraction 130, the guest may fit the guest interface device 14 on the head of the guest in accordance with the techniques discussed above. The wearable visualization device 12 may be coupled to the ride vehicle 132 via a cable 134, which may block separation of the wearable visualization device 12 from the ride vehicle 132 and/or may electronically couple the wearable visualization device 12 to the controller 50 (or other computing system) located remotely from the wearable visualization device 12. Then, upon boarding the ride vehicle in a loading/unloading zone 136 (e.g., loading zone; loading and unloading zone), the guest may couple the wearable visualization device 12 to the guest interface device 14. As noted above, the cover 34 may be in the extended configuration as the guest prior to the wearable visualization device 12 being coupled to the guest interface device 14. Then, once the wearable visualization device 12 is determined (e.g., by the controller, based on sensor data from the sensors) to be coupled to the wearable visualization device 12, the cover 34 may be adjusted to the retracted configuration to enable the guest to enjoy the virtual images during a ride cycle (e.g., as the ride vehicle 132 travels along a ride path 138).

In an embodiment, the cover 34 may remain in the retracted configuration for an entirety of the ride cycle (e.g., except while the guests are in the loading/unloading zone 136; regardless of separation of the wearable visualization device 12 from the guest interface device 14 during the ride cycle). In an embodiment, the cover 34 may remain in the retracted configuration until the sensor detects that the wearable visualization device 12 is separated from the guest interface device 14 (e.g., due to the guest pulling the wearable visualization device 12 away from the guest interface device 14; even during the ride cycle and outside of the loading/unloading zone 136). For example, as shown in FIG. 7, one of the guests has removed the wearable visualization device 12 from the guest interface device 14 during the ride cycle. The separation of the wearable visualization device 12 from the guest interface device 14 may be detected by the sensor, and in response, the controller may provide the control signals to the actuator to adjust the cover to the extended configuration. As noted above, other sensor data and/or other types of data may be utilized to adjust the cover 34 of the wearable visualization device 12. For example, the separation of the wearable visualization device 12 from the guest interface device 14 during the ride cycle may also be determined based on the position of the wearable visualization device 12 relative to the head of the guest and/or based on an acceleration that is outside of an expected acceleration range. Furthermore, the cover 34 may be adjusted during the ride cycle based on other types of data (e.g., show data, ride data, and/or user inputs).

In FIG. 7, the ride path 138 extends through a surrounding physical environment (e.g., real-world environment). However, it should be understood that the ride path 138 may be omitted and the ride vehicle 132 may be a generally stationary ride vehicle or attraction element (e.g., a seat in a movie theatre). In an AR context, when using the wearable visualization device 12 coupled to the guest interface device 14 with the cover 34 in the retracted configuration, the guest may be able to view virtual images overlaid onto the real-world environment. In a VR context, when using the wearable visualization device 12 coupled to the guest interface device 14 with the cover 34 in the retracted configuration, the guest may perceive virtual features without viewing the real-world environment.

In FIGS. 1-3, the cover 34 is a hinged panel that is configured to rotate (e.g., upwardly; similar to a door; about a pin) relative to the one or more lenses 20 to move between the extended configuration 38 and the retracted configuration 72. However, it should be appreciated that the cover 34 may have any suitable form that enables the cover 34 to selectively cover at least the portion of the one or more lenses 20. With the foregoing in mind, FIGS. 8-11 illustrate exemplary embodiments of the cover 34 that may be used with the wearable visualization device. In particular, FIG. 8 is a schematic view of an embodiment of the cover 34, wherein the cover 34 includes laterally-sliding portions 150 that are configured to move laterally, as shown by arrows 152, between the extended configuration 38 and the retracted configuration 72. FIG. 9 is a schematic view of an embodiment of the cover 34, wherein the cover 34 includes a vertically-sliding portion 160 that is configured to move vertically, as shown by arrows 162, between the extended configuration 38 and the retracted configuration 72. The laterally-sliding portions 150 and/or the vertically-sliding portion 160 may operate similarly to a garage door, for example. While two laterally-sliding portions 150 are illustrated in FIG. 8 and one vertically-sliding portion 160 is illustrated in FIG. 9, it should be appreciated that any number (e.g., 1, 2, 3, 4, or more) of laterally-sliding portions 150 and/or vertically-sliding portions 160 may be provided to form the cover 34.

FIG. 10 is a schematic view of an embodiment of the cover 34, wherein the cover 34 includes rotating portions 170 that are configured to rotate in a radial direction between the extended configuration 38 and the retracted configuration 72. For example, the rotating portions 170 may rotate radially-outwardly, in a manner similar to a camera shutter, to expose the one or more lenses 20 of the wearable visualization device. Furthermore, the rotating portions 170 may rotate radially-inwardly to cover the one or more lenses 20 of the wearable visualization device.

Figure 11:
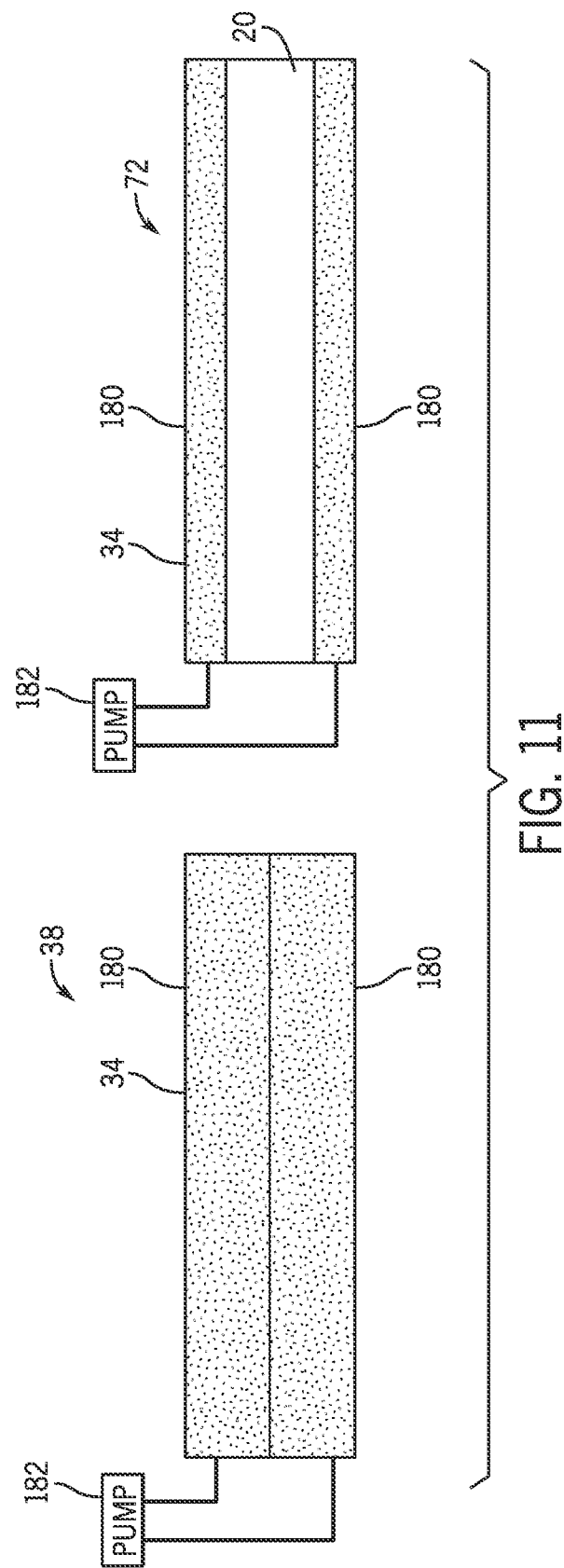
FIG. 11 is a schematic view of an embodiment of the cover of FIG. 6, wherein the cover includes fluid-filled portions that are configured to expand and contract based on a volume of fluid within the fluid-filled portions.

FIG. 11 is a schematic view of an embodiment of the cover 34, wherein the cover 34 includes fluid-filled portions 180 that are configured to expand and contract based on a volume of fluid within the fluid-filled portions 180. For example, when the volume of fluid within the fluid-filled portions 180 increases (e.g., via a pump 182), the fluid-filled portions may expand to cover the one or more lenses 20 of the wearable visualization device. However, when the volume of fluid within the fluid-filled portions 180 decreases, the fluid-filled portions may contract to expose the one or more lenses 20 of the wearable visualization device.

Figure 12:
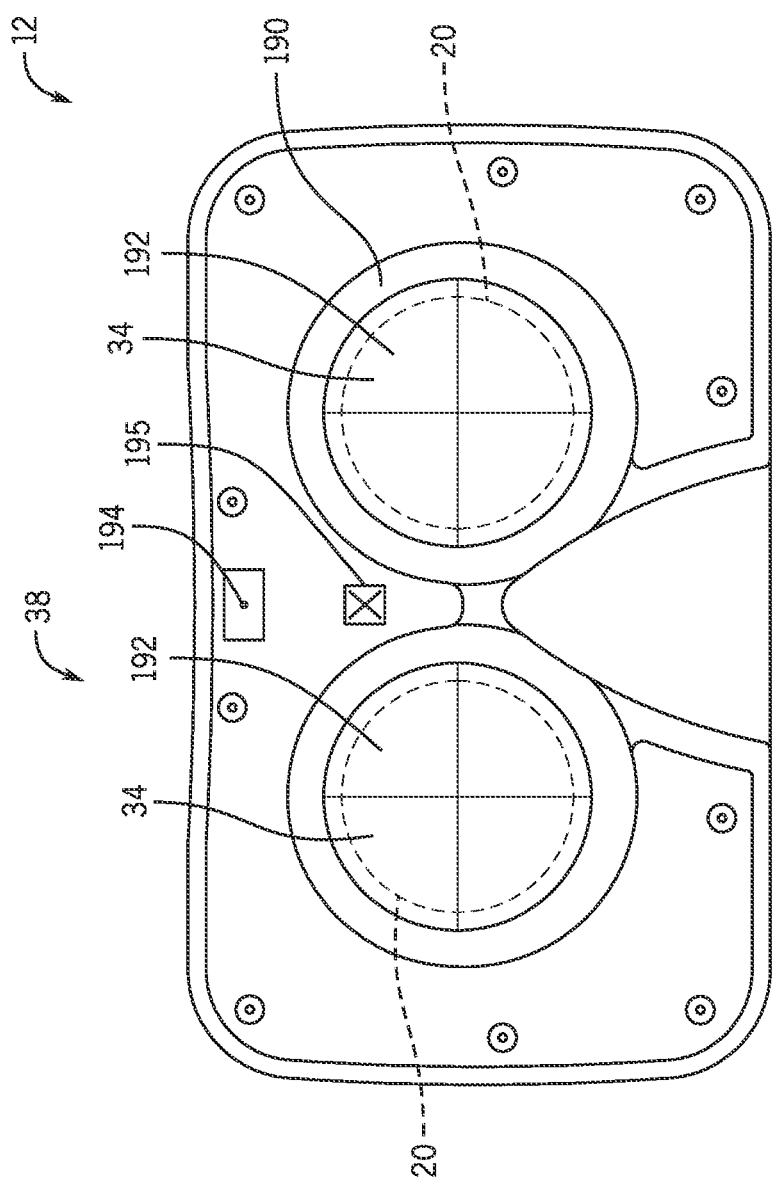
FIG. 12 is a rear view of an embodiment of a portion of a wearable visualization device having a cover, wherein the cover has a reflective surface.

As noted above, the cover 34 may be positioned on an inner surface (e.g., facing the guest) of the wearable visualization device 12. For example, FIG. 12 is a rear view of a portion of the wearable visualization device 12 having the cover 34 on an inner surface 190 (e.g., inner side) of the wearable visualization device 12. Advantageously, in such cases, the cover 34 may include a reflective surface 192. The reflective surface 192 may be formed by a reflective material (e.g., reflective paint, reflective film, reflective sticker) and may operate as a mirror (e.g., rear-view mirror). The reflective surface 192 may enable the guest to visualize their head and/or the guest interface device on their head. Thus, the reflective surface 192 may assist the guest in donning the wearable visualization device 12, thereby improving the experience of the guest and/or increasing throughput of the amusement park attraction, for example. It should be appreciated that the cover 34 having the reflective surface 192 may have any of the forms disclosed herein, as well as any other suitable form. For example, the cover 34 having the reflective surface 192 may include the laterally-sliding portions, the vertically-sliding portions, the rotating portions, and/or the fluid-filled portions. The cover 34 having the reflective surface 192 may be used on any suitable wearable visualization device 12, including any of the wearable visualization devices 12 of FIGS. 1-11.

The wearable visualization device 12 may include additional features that work in conjunction with the reflective surface 192. For example, the wearable visualization device 12 may include one or more light emitters 194 that are configured to emit light at least while the guest brings the wearable visualization device 12 toward the guest interface device. In an embodiment, the one or more light emitters 194 may be configured to emit light only at limited times, such as during a time period between the wearable visualization device 12 being picked up by the guest (e.g., during a boarding process; as detected by the sensor that monitors the position of the wearable visualization device 12 relative to the head of the guest and/or based on detected removal of the wearable visualization device 12 from a docking station on a structure of the amusement park attraction) and the wearable visualization device 12 being coupled to the guest interface device (e.g., as detected by the sensor that monitors the position of the wearable visualization device 12 relative to the guest interface device).

The one or more light emitters 194 may be positioned at any suitable location, such as above the cover 34 and/or the one or more lenses 20. The wearable visualization device 12 and/or the guest interface device may have guiding features to facilitate the coupling process. For example, the wearable visualization device 12 and the guest interface device may each include a visible marker 195 (e.g., an symbol; a light emitter), and the guest may use the reflective surface 192 to view and align the visible markers as the guest bring the wearable visualization device 12 toward the guest interface device. In an embodiment, the guiding features may include a symbol on the wearable visualization device 12 and a light emitter on the guest interface device, and the guest may use the reflective surface 192 to view and align a light beam emitted by the light emitter with the visible marker as the guest bring the wearable visualization device 12 toward the guest interface device. In an embodiment, the wearable visualization device 12 may be configured to detect alignment of the visible markers (e.g., using a sensor, such as a photodetector or camera) and may provide an alert (e.g., an audible alert, such as a beep, via a speaker; a visible alert, such as a colored light, via a light emitter) in response to the visible markers being properly aligned and/or being misaligned. For example, the wearable visualization device 12 may include a light emitter that emits a green light in response to the visible markers being properly aligned and/or a red light in response to the visible markers being properly aligned.

Figure 13:
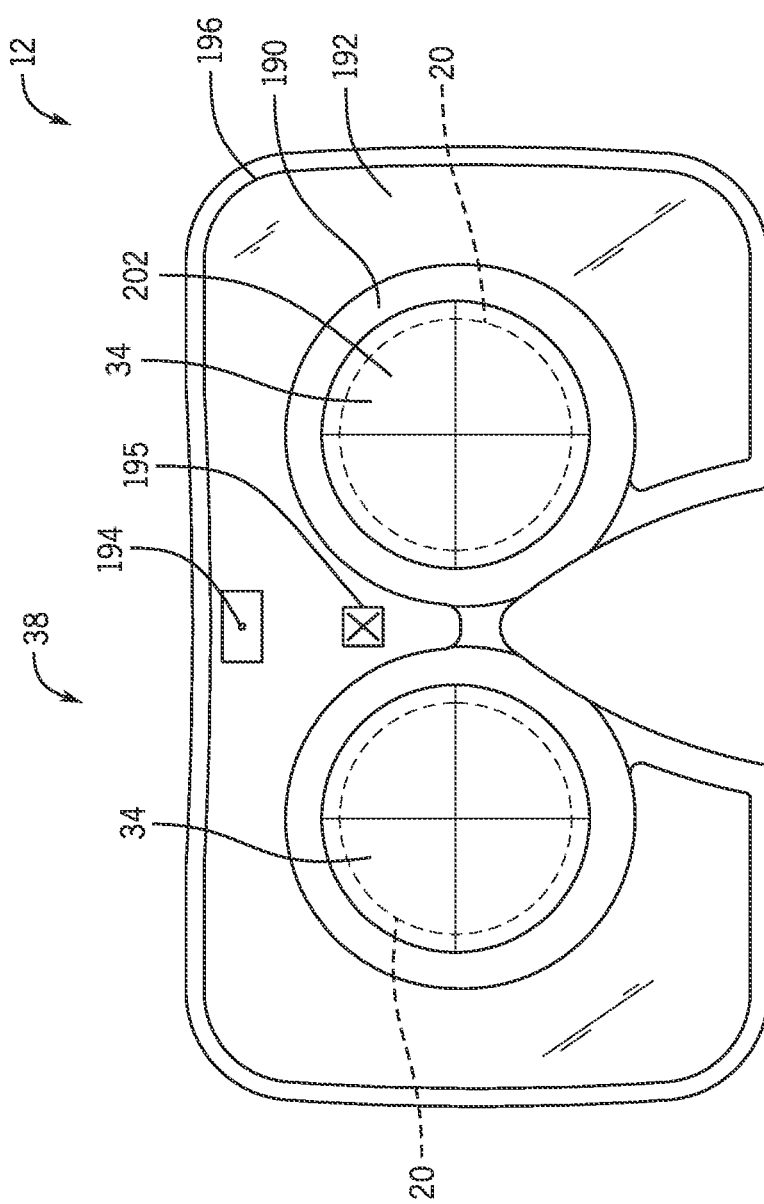
FIG. 13 is a rear view of an embodiment of a portion of a wearable visualization device having a lens portion and a reflective surface positioned adjacent to the lens portion.

FIG. 13 is a rear view of a portion of an embodiment of the wearable visualization device 12 having the reflective surface 192 positioned about the one or more lenses 20. As shown, the reflective surface 192 may be separate from the cover 34 and/or may be used without the cover 34 (e.g., the wearable visualization device 12 may be devoid of the cover 34). The reflective surface 192 may be on the inner surface 190 of the wearable visualization device 12. In an embodiment, the reflective surface 192 may positioned within a recess 196 formed in the housing 18. The reflective surface 192 may be formed by a reflective material (e.g., reflective paint, reflective film, reflective sticker) and may operate as a mirror (e.g., rear-view mirror). The reflective surface 192 may enable the guest to visualize their head and/or the guest interface device on their head. Thus, the reflective surface 192 may assist the guest in donning the wearable visualization device 12, thereby improving the experience of the guest and/or increasing throughput of the amusement park attraction, for example.

The wearable visualization device 12 may include additional features that work in conjunction with the reflective surface 192, as discussed above with respect to FIG. 12. For example, the wearable visualization device 12 may include one or more light emitters 194 that are configured to illuminate at least while the guest brings the wearable visualization device 12 toward the guest interface device. The wearable visualization device 12 and/or the guest interface device may have guiding features to facilitate the coupling process. In an embodiment, the wearable visualization device 12 may be configured to provide an alert in response to the visible markers being properly aligned and/or being misaligned. While the reflective surface 192 is shown as covering an entirety of the inner surface 190 about the one or more lenses 20, it should be appreciated that the reflective surface 192 may cover a portion of the inner surface 190 of the wearable visualization device 12. For example, the reflective surface 192 may cover a portion of the inner surface 190 between two lenses 20 along a lateral axis of the wearable visualization device 12. In an embodiment, more than one reflective surface 192 may be provided, such as one above each lens 20.

FIG. 14 is a flow diagram of an embodiment of a method 200 of operating a wearable visualization device having a cover, such as the wearable visualization device 12 having the cover 34. The method 200 disclosed herein includes various steps represented by blocks. It should be noted that at least some steps of the method 200 may be performed as an automated procedure by a computing system, such as by the AR/VR system 10. Although the flow chart illustrates the steps in a certain sequence, it should be understood that the steps may be performed in any suitable order and certain steps may be carried out simultaneously, where appropriate. Additionally, steps may be added to or omitted from the method 200.

As shown, in step 202, the method 200 may begin by receiving an indication that the wearable visualization device is coupled to a guest interface device that is configured to affix to a head of a guest. The indication that the wearable visualization device is coupled to the guest interface device may include sensor signals from a sensor of the wearable visualization device. For example, the sensor may include a proximity sensor or any other suitable type of sensor that is configured to detect that the wearable visualization device is coupled to the guest interface device.

In one implementation, the guest may affix the guest interface device to the head of the guest prior to boarding a ride vehicle of an amusement park attraction. Once the guest is seated in the ride vehicle, the guest may pick up the wearable visualization device and move the wearable visualization device toward the guest interface device until the wearable visualization device is coupled to the guest interface device (e.g., via the coupling interface and/or the magnetic interface). As noted above, the wearable visualization device may include the reflective surface to enable the guest to visualize the guest interface device during the coupling process.

In step 204, the method 200 may then proceed to controlling one or more actuators to adjust the cover from an extended configuration in which the cover is positioned over at least a portion of one or more lenses of the wearable visualization device to a retracted configuration in which the cover is not positioned over at least the portion of the one or more lenses of the wearable visualization device in response to receiving the indication that the wearable visualization device is coupled to the guest interface device and/or other indications (e.g., an indication that the guest is seated and/or restrained). In this way, the guest may be able to view the virtual features of the one or more lenses once the wearable visualization device is coupled to the guest interface device.

In step 206, the method 200 may then proceed to receiving an additional indication that the wearable visualization device is decoupled from the guest interface device. The additional indication that the wearable visualization device is decoupled from the guest interface device may include sensor signals from the sensor of the wearable visualization device. For example, the sensor may include the proximity sensor or any other suitable type of sensor that is configured to detect that the wearable visualization device is decoupled to the guest interface device. In some cases, the guest may separate the wearable visualization device from the guest interface device at the end of a ride cycle and/or during the ride cycle (e.g., due to becoming disoriented).

In step 208, the method 200 may then proceed to controlling the one or more actuators to adjust the cover from the retracted configuration to the extended configuration in response to receiving the indication that the wearable visualization device is decoupled from the guest interface device. In this way, the cover may protect at least a portion of the one or more lenses at certain times, such as while the wearable visualization device is not coupled to the guest interface device.

The method 200 may also include various other steps in accordance with the techniques and functionality disclosed herein. For example, the method 200 may also include steps that receive, process, and respond (e.g., by adjusting the cover) to other types of data, such as data that indicates a position of the wearable visualization device relative to a head of the guest, data that indicates a movement of the wearable visualization device, show data, ride data, and/or user inputs.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims. Any of the features shown and described with respect to FIGS. 1-13 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wearable visualization device, comprising:
   a housing;
   one or more lenses coupled to the housing and configured to display virtual features for visualization by a user of the wearable visualization device;
   a cover coupled to the housing and configured to adjust between an extended configuration in which the cover extends over at least a portion of the one or more lenses and a retracted configuration in which the cover does not extend over the at least the portion of the one or more lenses; and
   a controller configured to provide signals to an actuator to adjust the cover between the extended configuration and the retracted configuration based on sensor data.

2. The wearable visualization device of claim 1, wherein the sensor data is indicative of a position of the wearable visualization device relative to an interface device, a head of the user, or both.

3. The wearable visualization device of claim 2, wherein the controller is configured to provide the control signals to the actuator to adjust the cover to the retracted configuration in response to the sensor data indicating that the wearable visualization device is coupled to the interface device.

4. The wearable visualization device of claim 3, wherein the interface device is configured to affix to the head of the user.

5. The wearable visualization device of claim 1, wherein the sensor data is indicative of movement of the wearable visualization device.

6. The wearable visualization device of claim 5, wherein the controller is configured to process the sensor data by comparing the movement to one or more data sets that correspond to expected movement, unexpected movement, or both, of the wearable visualization device.

7. The wearable visualization device of claim 5, wherein the controller is configured to provide the control signals to the actuator to adjust the cover to the extended configuration based on the movement corresponding to unexpected movement.

8. The wearable visualization device of claim 1, wherein the sensor data is indicative of a position of a restraint device of a ride vehicle, and the controller is configured to provide the control signals to the actuator to adjust the cover to the retracted configuration based on the position corresponding to a locked position in which the restraint device restrains the user in the ride vehicle.

9. The wearable visualization device of claim 1, wherein the controller is configured to provide the control signals to the actuator to adjust the cover between the extended configuration and the retracted configuration based on the sensor data and a type of the virtual features being displayed via the one or more lenses.

10. The wearable visualization device of claim 1, wherein the cover is positioned on an outer side of the wearable visualization device, and the outer side is configured to face away from the user while the user wears the wearable visualization device.

11. The wearable visualization device of claim 1, wherein the cover is positioned on an inner side of the wearable visualization device, and the inner side is configured to face toward the user while the user wears the wearable visualization device.

12. A cover system for a wearable visualization device, the cover system comprising:
   a cover configured to couple to a housing of the wearable visualization device and to adjust between an extended configuration in which the cover extends over at least a portion of one or more lenses of the wearable visualization device and a retracted configuration in which the cover does not extend over the at least the portion of the one or more lenses of the wearable visualization device;
   an actuator configured to adjust the cover between the extended configuration and the retracted configuration; and
   a controller configured to provide control signals to the actuator to adjust the cover from the extended configuration to the retracted configuration in response to the wearable visualization device coupling to a support.

13. The cover system of claim 12, comprising a sensor configured to detect the coupling of the wearable visualization device to the support and to provide sensor data indicative of the coupling to the controller.

14. The cover system of claim 12, wherein the support comprises an interface device that is configured to affix to a head of a user, and the wearable visualization device couples to the interface device via a coupling interface.

15. The cover system of claim 14, wherein the coupling interface comprises a key slot interface or a magnetic interface.

16. The cover system of claim 12, comprising an additional cover configured to couple to the housing of the wearable visualization device and to adjust between a respective extended configuration and a respective retracted configuration, the cover is positioned on an inner side of the one or more lenses to face toward a user while the user wears the wearable visualization device, and the additional cover is positioned on an outer side of the one or more lenses to face away from the user while the user wears the wearable visualization device.

17. The cover system of claim 12, wherein the cover is transparent.

18. The cover system of claim 12, wherein the cover comprises a display configured to display one or more images.

19. A method of operating a cover system for a wearable visualization device, the method comprising:
   receiving, at a controller, an indication that the wearable visualization device is coupled to a support; and controlling, via the controller, an actuator to adjust a cover from an extended configuration in which the cover is positioned over at least a portion of one or more lenses of the wearable visualization device to a retracted configuration in which the cover is not positioned over the at least the portion of the one or more lenses of the wearable visualization device in response to receiving the indication that the wearable visualization device is coupled to the support.

20. The method of claim 19, comprising:
receiving, at the controller, an additional indication that an object is approaching the wearable visualization device; and
controlling, via the controller, the actuator to adjust the cover from the retracted configuration to the extended configuration in response to receiving the additional indication that the object is approaching the wearable visualization device.

* * * * *